(12) United States Patent
Beaulieu (10) Patent No.: US 7,524,415 B2
(45) Date of Patent: Apr. 28, 2009

(54) EFFLUENT PURIFYING PLANT WITH CENTRALIZED STRUCTURE

(76) Inventor: Bernard Beaulieu, Le Ranc, Chassiers (FR) F-07110

( * ) Notice: Subject to any disclaimer, the term of this patent is extended or adjusted under 35 U.S.C. 154(b) by 0 days.

(21) Appl. No.: 11/908,165

(22) PCT Filed: Mar. 7, 2006

(86) PCT No.: PCT/FR2006/050199

§ 371 (c)(1),
(2), (4) Date: Nov. 9, 2007

(87) PCT Pub. No.: WO2006/097650

PCT Pub. Date: Sep. 21, 2006

(65) Prior Publication Data

US 2008/0185321 A1     Aug. 7, 2008

(30) Foreign Application Priority Data

Mar. 16, 2005 (FR) .................................. 05 50670

(51) Int. Cl.
*B01D 24/00* (2006.01)
*C02F 1/00* (2006.01)
(52) U.S. Cl. ................. 210/207; 210/304; 210/305; 210/512.1; 210/256; 210/261
(58) Field of Classification Search ........... 210/205, 210/207, 220, 256, 260, 261, 262, 519, 512.1, 210/304, 305, 702, 787; 366/339
See application file for complete search history.

(56) References Cited

U.S. PATENT DOCUMENTS

| 5,407,584 A | 4/1995 | Broussard et al. |
| 2004/0025961 A1 | 2/2004 | Beaulieu |

FOREIGN PATENT DOCUMENTS

| FR | 2216231 A1 | 8/1974 |
| FR | 2810310 A1 | 12/2001 |

OTHER PUBLICATIONS

International Search Report issued in related application No. PCT/FR2006/050199 on Jul. 3, 2006.
English translation of the International Search Report issued in related application No. PCT/FR2006/050199 on Jul. 3, 2006.

*Primary Examiner*—Matthew O Savage
*Assistant Examiner*—Lucas Stelling
(74) *Attorney, Agent, or Firm*—Baker & Daniels LLP (57) ABSTRACT

The invention concerns a plant comprising, on a vertical axis, a homogenizing vessel (1) followed by a settling vessel (2) and a flocculating vat (3). The homogenizing vessel (1) is fed by tangential intake (92) of the effluent and the input (611) and the output (612) of the upper tube (61) comprise a helical guide (613, 614) for driving the effluent in rotation. The lower tube (62) of larger diameter than that of the upper tube (61) is terminated by an outlet in the form of an upside-down cone (622) with reduced cross-section (621). The lower portion (31) of the flocculation vat (3) is truncated, with an apex angle, smaller than that of the upper portion (32), said lower portion (31) being parallel to the cone of the outlet of the lower tube (62), and anti-backflow cones (7, 8) surround the conduit (6) in the settling vessel (2).

13 Claims, 8 Drawing Sheets

EFFLUENT PURIFYING PLANT WITH CENTRALIZED STRUCTURE

FIELD OF THE INVENTION

The present invention concerns an effluent purifying plant with centralized structure comprising, on a vertical axis,
a homogenizing vessel receiving the effluent with the addition of a coagulating or flocculating agent,
a settling vessel beneath the homogenizing vessel,
a flocculating vat comprising a frustoconical upper portion extended by a lower portion, which vat is placed inside the settling vessel and in which sludge flakes form,
a pipe arranged in the axis, leading downwards, connecting the homogenizing vessel to the lower part of the flocculating vat through which the effluent passes from bottom to top and is clarified in contact with the sludge flakes,
the pipe comprising an upper tube, one end of which opens into the homogenizing vessel and the other end of which opens into a lower tube of larger diameter than that of the upper tube, the lower end thereof opening into the lower part of the flocculating vat,
the lower portion of the settling vessel having a frustoconical portion forming the sludge vat which receives the sludge overflowing from the flocculating vat,
an annular vessel surrounding the settling vessel and receiving the filtered water by overflow from the settling vessel.

A plant of this type is already known from the document FR 00 07 42 (FR 2 810 310).

Aim of the Invention

The aim of the present invention is to develop an effluent purifying plant of the type defined above permitting improved management of the dynamic flow by improved distribution and utilisation of the injection of the coagulating agent, acceleration of the coagulation phenomenon by avoiding premature flocculation in the mixing vat, or preventing the bed of sludge from interfering with flocculation and avoiding disturbing flocculation by the rise of the clarified liquid while also permitting bacteriological treatment of the clarified liquid, with very compact means occupying the minimum ground surface area.

Statement and Adavantages of the Invention

To this end, the invention concerns an effluent purifying plant with centralized structure of the type defined above, characterized in that
the homogenizing vessel has a tangential intake for the effluent,
the inlet and the outlet of the upper tube include a helical guide for setting the effluent in rotation,
the lower tube of larger diameter than that of the upper tube is terminated by an outlet in the form of an upside-down cone with reduced cross-section,
the lower portion of the flocculating vat is frustoconical with an apex angle smaller than that of its upper portion, the lower portion being parallel to the cone of the outlet of the lower tube, and
at least one anti-backflow cone surrounds the pipe in the settling vessel.

In general terms, the plant according to the invention permits excellent management of the flows, no matter what the nature of the effluents, thereby considerably simplifying the setting-up of the plant and its use while reducing the operating costs and the consumption of coagulating and flocculating agents.

Owing to the distribution of the effluent at the point of injection of the coagulating and/or flocculating agent, especially by injecting the flocculent upstream of a static mixer and owing to a tangential intake in the homogenizing vessel, the flocculating agent can be distributed more efficiently and therefore the quantities consumed reduced. The means of the invention make it possible to maintain the liquid in rotation on itself by the vortex effect, thereby avoiding any untimely deposit of flakes capable of clogging parts of the plant. The sludge flakes are deposited in the sludge vat without interfering with the rise of the liquid or disturbing the flocculation downstream.

The bottom of the flocculating vat facilitates the circulation and rise of the effluent charged with flocculating agents so that the sludge flakes develop, rise towards the upper portion of the flocculating vat and then pass into the sludge vat either by overflow or through openings provided for this purpose.

The anti-backflow cone or cones also facilitate the flocculation and release of the sludge flakes towards the sludge vat, preventing the sludge flakes from collecting together in the centre of the plant and gradually clogging the latter by spreading outwards.

According to another advantageous feature, a second anti-backflow cone is arranged above the flocculating vat and this second cone is adjustable. The adjustment makes it possible to adapt the effect of the anti-backflow cone to the physical/chemical characteristics of the effluent.

The anti-backflow cone or cones also facilitate the preferential circulation of the water first of all charged with sludge flakes and then of the clarified water, in the part above the area of formation and retention of the sludge flakes. The clarified water is then forcibly distributed at the surface of the filter-mass in order to avoid any formation of a preferential passage through the filter-mass.

According to another advantageous feature,
the outlet of the settling vessel has stabilising baffles for the liquid and peripheral distribution of outlet openings,
the annular vessel surrounding the settling vessel contains a filter-mass in the upper portion, its lower portion constituting the storage volume for the filtered water.

Owing to the baffles, the regulation of the flow rate and rendering the distribution of the flows towards the filter-mass uniform make it possible to eliminate at least 95% of the residual matter in suspension.

According to another advantageous feature, the taper of the upper portion of the flocculating vat is greater than that of the its lower portion.

This double frustoconical shape prevents the accumulation of sludge in the angles of the lower truncated cone and the liquid accelerates along the outer wall. Then, the more flared frustoconical shape directs the flow outwards, winding round the area of stagnant liquid around the pipe and beneath the anti-backflow cone.

According to another advantageous feature, the lower tube is in the shape of two truncated cones assembled by their major base, the inlet cross-section corresponding to that of the upper tube to continue by flaring out, and an injection means injects a flocculating agent in the middle of this volume.

This embodiment is particularly advantageous in the case of weakly charged effluents, such as for example river water to be transformed into potable water.

The double cone with a wide central portion at which the flocculating agent is injected makes a thorough mixing of the flocculating agent and the effluent possible so that flocculation takes place within this limited enclosure in which the speed of passage of the effluent is reduced, the effluent being always in rotation about the axis of the plant.

Flocculation is substantially terminated at the outlet of the double cone. Then, during the rise of the flow in the vessel, the flakes collect together in order to be deposited in the sludge vat.

According to another advantageous feature, a means for metering the reagent or reagents is provided upstream of the homogenising vessel and this metering means is followed by a static mixer.

According to another advantageous feature, the annular vessel is composed of a lower portion surrounding the lower portion of the settling vessel, and an upper portion containing the filter-mass installed above and in prolongation of the settling vessel and having the same outer wall, these two portions being connected by a pipe, an annular channel surrounding the pipe to connect the upper volume of the settling vessel to irrigation ramps opening out above the filter-mass.

This solution is particularly advantageous because of the compactness of the plant and the volume available for collecting the treated water.

The cleansed liquid which rises in the annular channel circulates at an extremely reduced speed. In addition, a cone placed at the inlet of the annular channel prevents any sludge flakes which might float at the upper wall of the flocculating vat from being likely to pass into the annular channel. Thus, this cone has not only a separating and retaining effect, but also a guiding effect, creating a very slow circulation like a damming means, so that the flakes which may be floating in the upper portion of this volume are redirected downwards and gradually descend into the sludge vat while adhering to any other possible sludge flakes.

In the case of this improvement, advantageously, a collecting chamber is provided which separates the upper portion from the upper volume of the settling vessel, the collecting chamber being connected to the lower portion by a pipe equipped with a valve.

It is also of advantage to treat the effluent by means of a pre-treatment before introducing it into the actual plant described above, in order to avoid causing excessive stress on the plant.

To this end, the plant includes an annular pre-treatment vessel, surrounding the outer vessel, and composed of a lower volume in which the effluent arrives with the addition of a coagulating and/or flocculating agent in order to deposit the sludge flakes there, and of an upper volume in which the partially clarified liquid rises in order to be transferred into the distribution vessel.

In particular, the annular pre-treatment vessel comprises a flocculating vat formed of an annular plate provided with frustoconical cavities bordered by passage openings, a pipe coming from an effluent distribution chamber opening into each cavity, and the lower volume is bordered by a bottom in the shape of an annular collar constituting the sludge storage vat.

According to another feature, the lower volume of the vessel is separated from its upper volume by a partition provided with openings, the inlet of which is delimited by divergent cones, these openings being offset angularly in relation to the angular position of the flocculation cavities so as to occupy an intermediate position in each case.

This pre-treatment with decantation makes it possible not only to eliminate a considerable part of the charge of the effluent, but above all such elimination facilitates the treatment of the effluent by the central portion of the plant already mentioned above, since the effluents arriving in this central portion will thus all have substantially related characteristics.

The plant also permits bacteriological treatment of the liquid at the outlet of the decanting and filtering portion, and for this purpose the plant includes a complementary bacteriological treatment portion composed of a series of annular chambers surrounding the outer vessel and receiving the cleansed liquid, which passes through these chambers connected in a cascade by communication pipes, being provided with helical guides for setting in rotation the stream of liquid and suspended particles constituting the charge of each chamber, the communication pipes being U-shaped tubes, the inlet arm of which faces downstream in the upstream chamber in order to open out through an outlet facing downstream in the following annular chamber, in the direction of flow of the liquid in these chambers.

The effectiveness of the bacteriological treatment plant permits a significant reduction in the materials used, and consequently a reduction in the operating costs of the plant.

DRAWINGS

The present invention will be described below in more detail by means of exemplary embodiments shown diagrammatically in the appended drawings, in which.

DESCRIPTION OF EMBODIMENTS

Figure 1:
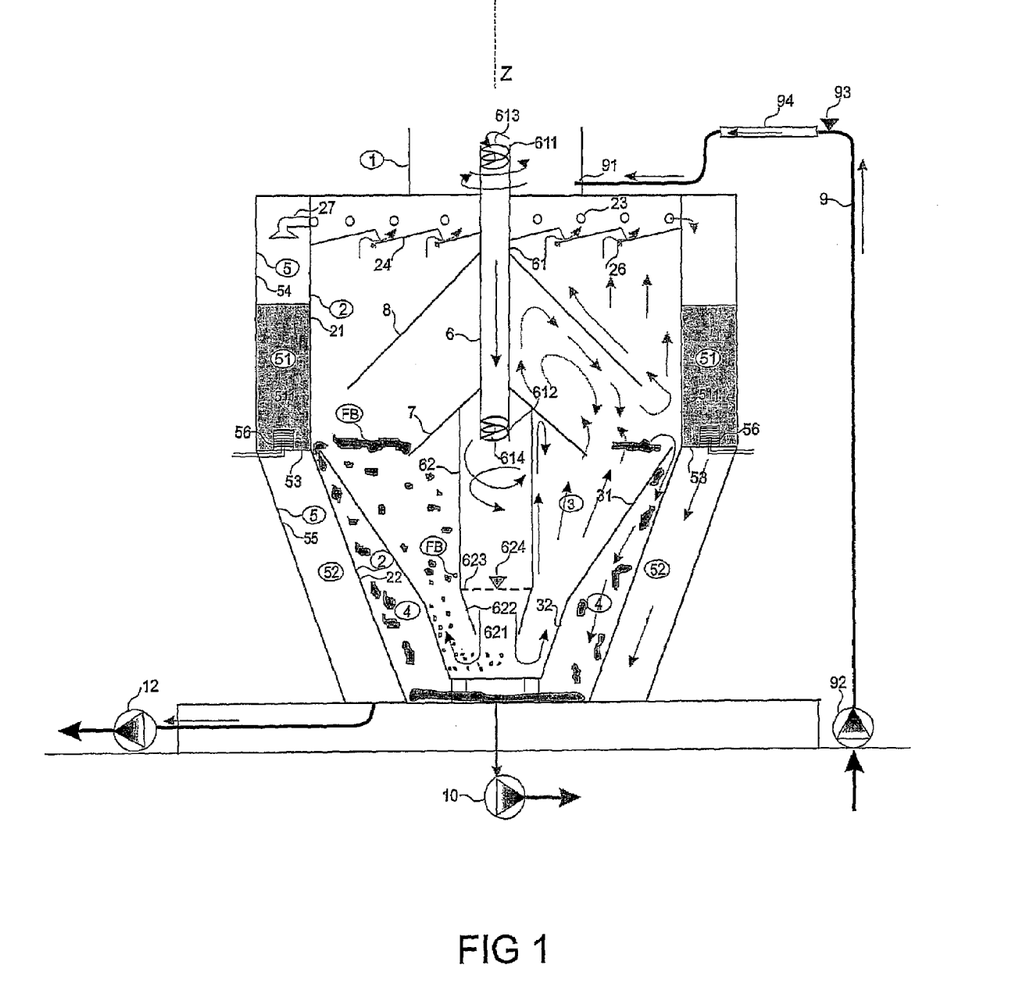
FIG. 1 is a view in axial section of a first embodiment of an effluent purifying plant.

According to FIG. 1, the invention concerns an effluent purifying plant with centralized structure. The plant, distributed schematically about a vertical axis ZZ, preferably in rotational symmetry, is composed of a homogenizing vessel 1 receiving the effluent to be treated. Beneath the homogenizing vessel there is a settling vessel 2 in which a flocculating vat 3 is located, and the space between the settling vessel 2 and the flocculating vat 3 constitutes the sludge vat 4, the upper portion 21 forming the actual settling volume; around the settling vessel 2, an annular vessel 5 receives the filtered water by overflow from the settling vessel 2. An immersion pipe 6 arranged in the axis ZZ descends through the homogenizing vessel 1 as far as the lower part of the flocculating vat 3. The effluent receives flocculating and coagulating agents. By the effect of rotation it circulates in the homogenizing vessel 1 then into the pipe 6 descending through the settling vessel 2 and the flocculating vat 3, in order to rise up there, release sludge flakes FB and allow the filtered water to be collected. The settling vessel 2 has at least one anti-backflow cone 7, 8 surrounding the pipe 6 and pushing back the sludge flakes, floating in the ascending flow of filtered effluent/water, which rises to the top 21 of the settling vessel 2.

The circulation of the liquid (effluent or filtered liquid, filtered water) is indicated by arrows without reference numbers. Circulation takes place either on a more or less straight path, or according to curved arrows indicating a rotational movement of the liquid. There are also return or winding movements for example below the anti-backflow cone or cones 7, 8.

The different vessels 1, 2, 3 and pipe 6 are connected and supported by means that are neither shown nor described, since they are customary means of construction. All that is important is the arrangement grouped and centred about the axis ZZ so that the plant occupies the least possible ground surface area and volume for a maximum capacity of effluents and filtered liquids.

In more detail, the effluent purifying plant shown in section, especially in axial section in FIG. 1, will be explained hereinafter.

The homogenizing vessel 1 located in the upper portion of the plant is equipped with an effluent intake 9. The pipe 91 of this intake opens tangentially into the homogenizing vessel 1 in order to induce a rotational movement of the liquid therein. Upstream of the homogenizing vessel 1, the effluent pipe 91 coming, for example, from a pump 92, has an injection point 93 for coagulant/flocculant. The injection point 93 is followed by a static mixer 94 in the form of a chamber which slows down the fluid flow rate by means of an increase in the cross-section in order to facilitate mixing between the effluent and the injected coagulating/flocculating agents.

The settling vessel 2 which is located beneath the homogenizing vessel 1 also has a rotationally symmetrical shape with respect to the axis ZZ. The vessel 2 is composed overall of a substantially cylindrical, circular, upper portion 21, and of a frustoconical lower portion 22.

The lower portion 22 houses the flocculating vat 3, and the upper portion 21 forming the volume providing the actual settling function houses one, and preferably two, anti-backflow cones 7, 8. One (7) of the cones is fixed, the other (8) is adjustable. The two cones 7, 8 are centred on the axis ZZ and surround the effluent pipe 6 descending from the homogenizing vessel 1 almost to the bottom of the flocculating vat 3.

The flocculating vat 3 does not abut with the upper edge of its side 31 the side of the lower portion 22 of the settling vessel 2, but leaves a gap and an annular volume as well as a lower volume beneath the flocculating vat 3 (this latter rests on feet in the settling vessel) to form a sludge collecting chamber or sludge vat 4. The bottom of this vat 4 is connected to a sludge discharge pump 10. The pump 10 is controlled or programmed to discharge the sludge according to its accumulation or periodically.

The effluent pipe 6 is preferably installed according to the axis ZZ, that is, according to the axis of symmetry of the structure of the plant. The descending pipe 6 is composed of a first tube 61 opening into the homogenizing vessel 1, rising up in this latter so as to delimit therein an annular volume facilitating the setting in rotation of the effluent arriving and rotating in the homogenizing vessel 1.

The upper tube 61 descends through the upper portion 21 of the settling vessel 2 to meet a lower tube 62 forming part of the pipe 6. The lower tube 62 opens out close to the bottom of the flocculating vat 3. The lower tube 62 extends the upper tube 61 and has a diameter significantly larger than that of the upper tube. Both at its entry 611 into the homogenizing vessel 1 and at its outlet 612 into the lower tube 62, the upper tube 61 includes in each case a helical guide 613, 614 in the form of a vane, incorporated in the end of the tube 61 so as to impart a rotational impulse to the effluent which passes through the upper tube 61.

This rotational movement of the effluent continues through the lower tube 62 which is terminated by a narrowed outlet 621 constituted by a truncated cone, the apex of which faces downwards. At the base of the truncated cone 622, the lower tube 62 has a support 623 equipped with an injection point for a flocculating agent 624.

The flocculating vat 3 into which the pipe 6 opens and, more precisely, its rotationally symmetrical lower tube 62, is formed by the combination of two frustoconical shapes 31, 32, a very flared frustoconical upper portion 31 and a less flared frustoconical lower portion 32. The truncated cone 622 terminating the lower portion of the lower tube 62 of the pipe 6 and the truncated cone 32 constituting the lower portion of the flocculating vat 3 are preferably parallel, so as to regularize the flow emerging from the opening 622 of the tube 62 in order to rise up in the flocculating vat. On the other hand, the upper truncated cone 31 of the flocculating vat 3 is very widely flared, so as to slow down the flow velocity of the ascending flow in order to facilitate the formation of sludge flakes which collect together and gradually rise up, entrained by the liquid of the flocculating vat. Then, the large sludge flakes FB pass over the edge of the vat 3 and, since the speed of the liquid at this location is very slow, the flakes descend into the sludge vat 4 and accumulate at the bottom.

One (7) of the anti-backflow cones is located just above the flocculating vat 3. It is a frustoconical surface engaged both on the lower tube 62 of the pipe 6 and around the lower end of the upper tube 62. This anti-backflow cone 7 serves to stabilise the flow of effluent rising up in the flocculating vat 3, in proximity to the outer wall of the lower tube 62.

The cone 7 thus creates a ring of more or less immobile liquid surrounding the lower tube so that any flakes located in this area circulate very slowly and therefore have a tendency to drop down again, while the flakes entrained by the circulation of the liquid arriving from the pipe 6 pass preferentially towards the collar of the flocculating vat 3.

Above this first cone 7 there is a second cone 8 located clearly in the upper volume 21 of the settling vessel 2, that is, the actual settling volume, again in such a way as to stabilise the flow in order to facilitate the circular rising/falling movement of any streams of cleansed liquid, in order to eliminate therefrom the last particles or flakes of sludge. This cone 8 is adjustable in height in the settling volume 21 of the vessel 2.

The vertical positioning of the cone 8 depends on the residual density of the sludge flakes entrained in the ascending flow of the clarified water and is intended to regulate the ascending speed of the flow in order to obtain the precipitation of the flakes.

For the following adjustment, the type of effluent to be treated, knowing the behaviour of the flakes, and according to the flow rate to be treated, pre-adjustment is carried out in the workshop and the final positioning is carried out in situ after the setting up of the whole of the plant.

In its upper portion 21, the settling vessel 2 is equipped with a peripheral distribution of overflow openings 23. Beneath these openings 23, inside the settling vessel 2, there is an assembly of very slightly inclined baffles 24. The filtered water which rises up again in the settling vessel 2 passes between the baffles 24 then through the openings 23.

In order to facilitate the distribution of the filtered water in the vessel 5, the ejection openings 23 each open preferably into an elbow 27 terminated by a sprinkler rose so as to cause the liquid to drip or trickle onto a relatively large surface area of the filter-mass 511 and avoid preferential passages.

The settling vessel is in fact surrounded by the annular vessel 5, the lower portion 52 of which makes it possible to receive the filtered water, and the upper portion 51 contains a filter-mass supported by a partition 53 separating the upper portion 51 and the lower portion 52.

The annular vessel 5 substantially follows the contours of the settling vessel 2. It is bounded by an outer wall, the lower portion 55 of which is frustoconical and the upper portion 54 cylindrical.

The horizontal partition 53 in the form of an annular collar is pierced by holes to allow the water which has passed through the filter-mass 511 to descend into the lower portion 52, whence it can be extracted by a pump 12.

The baffles 24 of the settling vessel 2 are equipped with cleaning ramps 26 connected to a water source, for example of filtered water, and below the filter-mass 511, above the partition 53, strainers 56 allow water to be injected, if necessary, charged with gas for cleaning the filter-mass 511 by reverse circulation.

Figure 2:
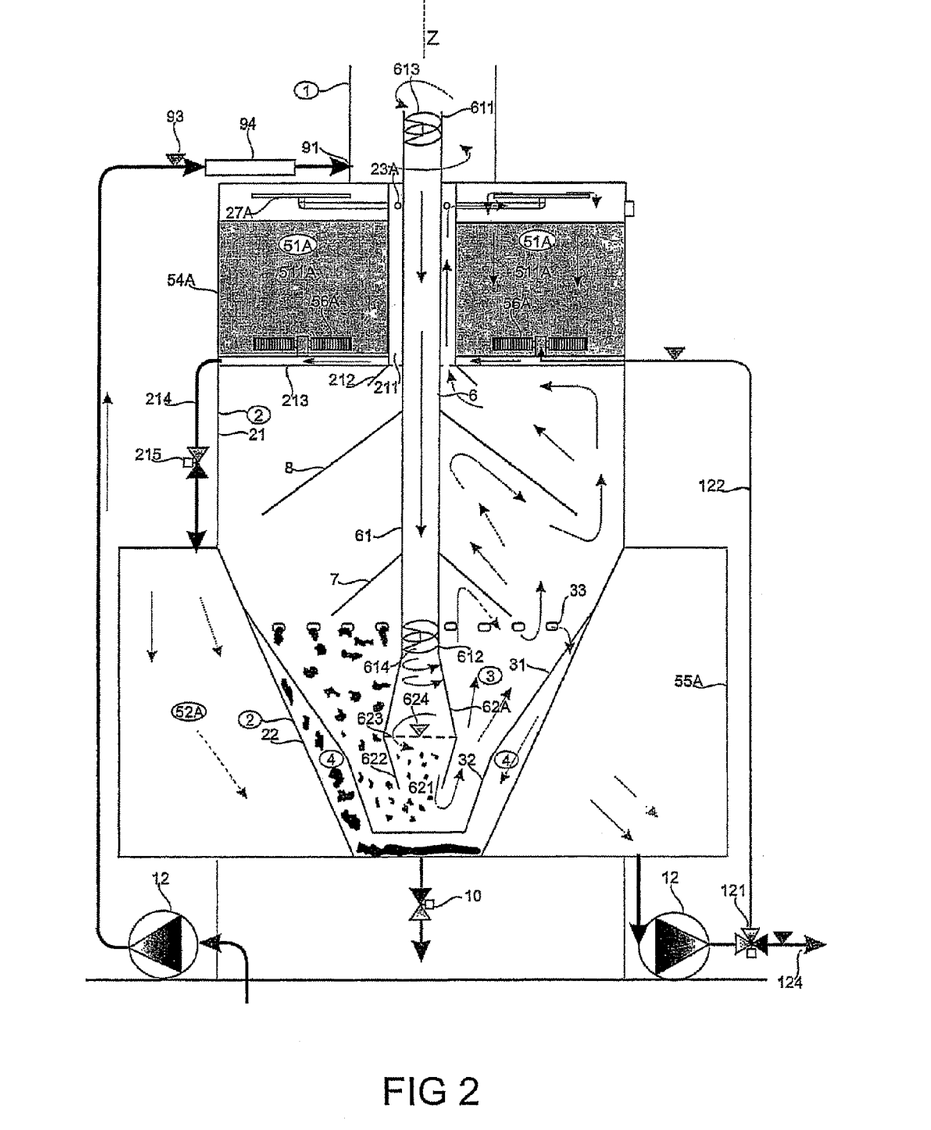
FIG. 2 shows a first variant of the effluent purifying plant, especially for the production of potable water.

FIG. 2 shows a first variant of the plant of FIG. 1. This variant repeats the main elements of the first embodiment, and these elements bear the same references without their description being repeated in detail. The elements which are analogous but particular to this variant will bear the same references with the addition of the suffix A.

Thus, the lower tube 62A of the pipe 6 is formed by a flared portion in the shape of a truncated cone to which is connected, in an inverted position, the truncated cone 622; these two truncated cones joined by their major base include at the join the support 623 equipped with the injection point for flocculating agent 624.

The flocculating vat 3 has the same shape as that of the first embodiment, except that, close to its upper edge, it has openings 33 for the passage of the sludge flakes which will no longer pass over the upper edge. These openings 33 open into the sludge vat 4 formed as previously between the flocculating vat 3 and the lower portion 22 of the settling vessel 2. The extraction of the sludge is again effected by a pump or a valve 10 in the lower portion of the sludge vat 4.

The principal modifications of this variant concern the vessel receiving the filtered effluent or clarified water. This vessel is divided into two parts, an upper portion 51A installed above the settling vessel 2 and in prolongation of this latter, sharing with the upper volume 21 of the settling vessel 2 the same circular cylindrical wall. The second part or lower portion 52A of the vessel receiving the filtered water is located in the lower part around the lower portion 22 of the settling vessel. The lower portion 52A shares with the settling vessel the common wall 22. It is bounded externally by a circular cylindrical wall 55A with a bottom and a top.

The lower portion 52*a* is connected to the pump 12 for drawing off the filtered liquid (filtered water).

The intake for the upper portion 51*a* of the vessel is provided by an annular channel 211, surrounding the upper tube 61 of the pipe 6. The annular channel 211 has an inlet in the upper volume 21 formed by a cone 212 also intended to stabilise the flows like the anti-backflow cones 7 and 8. In the upper portion the annular channel 211 has openings 23A comparable to the overflow openings 23 of FIG. 1 which open into irrigation ramps 27A distributing the filtered liquid over the filter-mass 511A. The filter-mass 511A is located above the partition bounding the collecting chamber 213 collecting the filtered liquid at the outlet of the upper portion 511A. This chamber 213 is connected by a pipe 214, equipped with a valve 215, to the lower portion 52A. The valve 215, preferably remote-controlled, makes it possible to discharge the liquid emerging from the filter-mass 511A, continuously or discontinuously.

The cleansing of the filter-mass 511A is carried out by countercurrent or reverse flow by means of strainers 56A that are installed at the base of the filtering material in the upper portion 51A and are fed by a pipe 122 coming from a three-way valve 121 at the outlet of the draught pump 12. The valve 121, normally connected to the outlet 124 for drawing off filtered water, may be switched in order to send the filtered water back through the strainers 56A and the filter-mass 511A, the water then circulating in the reverse direction being discharged by means not shown.

The plant thus described is suited quite particularly to the production of potable water.

Figure 3:
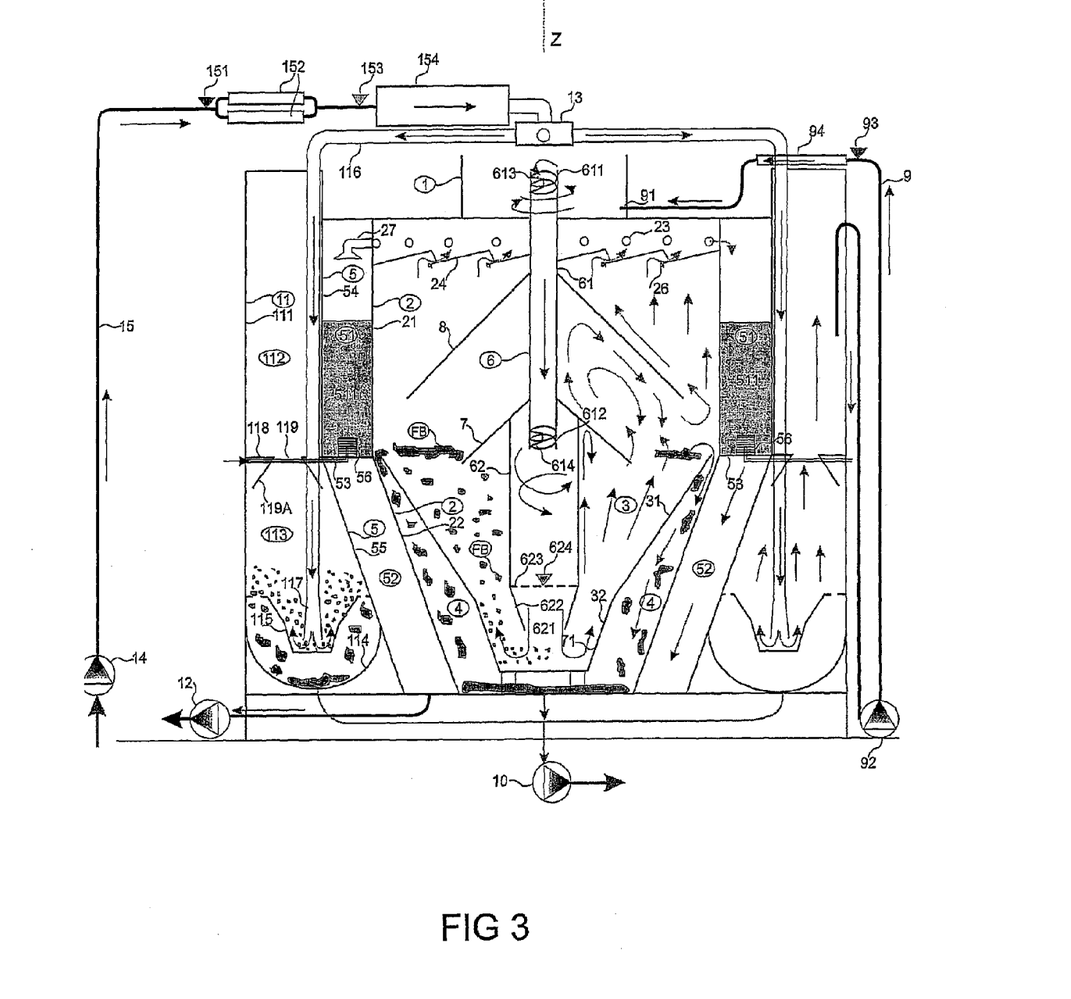
FIG. 3 is a sectional view analogous to that of the preceding figures of another embodiment of an effluent purifying plant including a pre-treatment section.

FIG. 3 shows an alternative embodiment corresponding substantially to FIG. 1, with the addition of means making it possible to decant the effluent before its entry into the actual plant through the homogenizing vessel 1.

Thus, the concentric structure of the effluent purifying plant described above is surrounded externally by another annular structure forming an outer vessel 11 for pre-treatment and partial settling. This annular outer vessel 11 is bounded by an outer, circular cylindrical wall 111 forming an upper volume 112 and a lower volume 113, this latter benefitting from the increase in volume provided within the circumscribed perimeter, owing to the frustoconical shape of the lower portion 55 of the annular chamber 5 surrounding the settling vessel 2.

The outer annular vessel 11 makes it possible to decant a significant portion of the solid matter in the form of sludge or flakes and, for this purpose, its lower volume 113 is bounded by an annular collar 114 forming the bottom of the outer annular vessel. Above the annular collar 114, for example toroidal in form and of semi-circular cross-section, there is a flocculating vat 115 formed by an annular plate 115A equipped with frustoconical cavities 115B, into which descending pipes 116 open. The frustoconical cavities 115B are bordered by openings 115C through which the sludge flakes descend into the sludge vat 114. For the purpose of simplification, these different means will be termed: flocculating vat 115. The pipes 116 are connected in the upper portion of the plant to a distribution vessel 13, itself fed with effluent by a pump 14 and a pipe 15 with, preferably, an injection point 151 for coagulating agent, followed by a chamber forming a static mixer 152, then an injection point 153 for flocculating agent, followed also by a chamber forming a static mixer 153 for opening into the distribution vessel 13. A plurality of pipes 116 depart from the distribution chamber 13 in radial directions to descend to the bottom of the flocculating vat 115 through a slightly divergent form of pipe 117 so as to slow down the speed of the effluent.

At this level, significant flocculation occurs, and may represent from 30 to 40% of the sludge in suspension in the liquid to be cleansed. The sludge overflows from the flocculating vat 115 to reach the sludge storage vat 114 formed by the annular collar whence the sludge is pumped.

The effluent is fed in by the pump 14 and the purified water is extracted by the pump 12. The lifting pump 92 takes up the effluent that has undergone the first decantation of its sludge flakes in the outer annular vat 11. The effluent arriving in the lower portion 113 of the annular vessel 11 rises up to pass into the upper volume 112 forming the annular buffer chamber located above the partition 118 dividing the outer annular vessel 11. Communication between these two annular volumes is provided by openings 119 distributed in the partition 118 and the inlet of which is preceded by a divergent cone 119A.

The cleansing of the filter-mass 511 of the annular chamber 5 receiving the filtered water is effected by sending filtered water in the reverse direction from the normal direction of passage of the water through the filter-mass. This water is introduced, in the lower part at the lower partition 53, through the strainers 56. The water thus injected for cleansing the filter-mass 511 is preferably water recovered in the filtered water storage area. The water is fed in preferably by the same pump as that which extracts the filtered water from the enclosure 52. A system of valves makes it possible to circulate the water for cleansing the filter-mass solely through the mass and not through the homogenizing vessel.

Figure 3A:
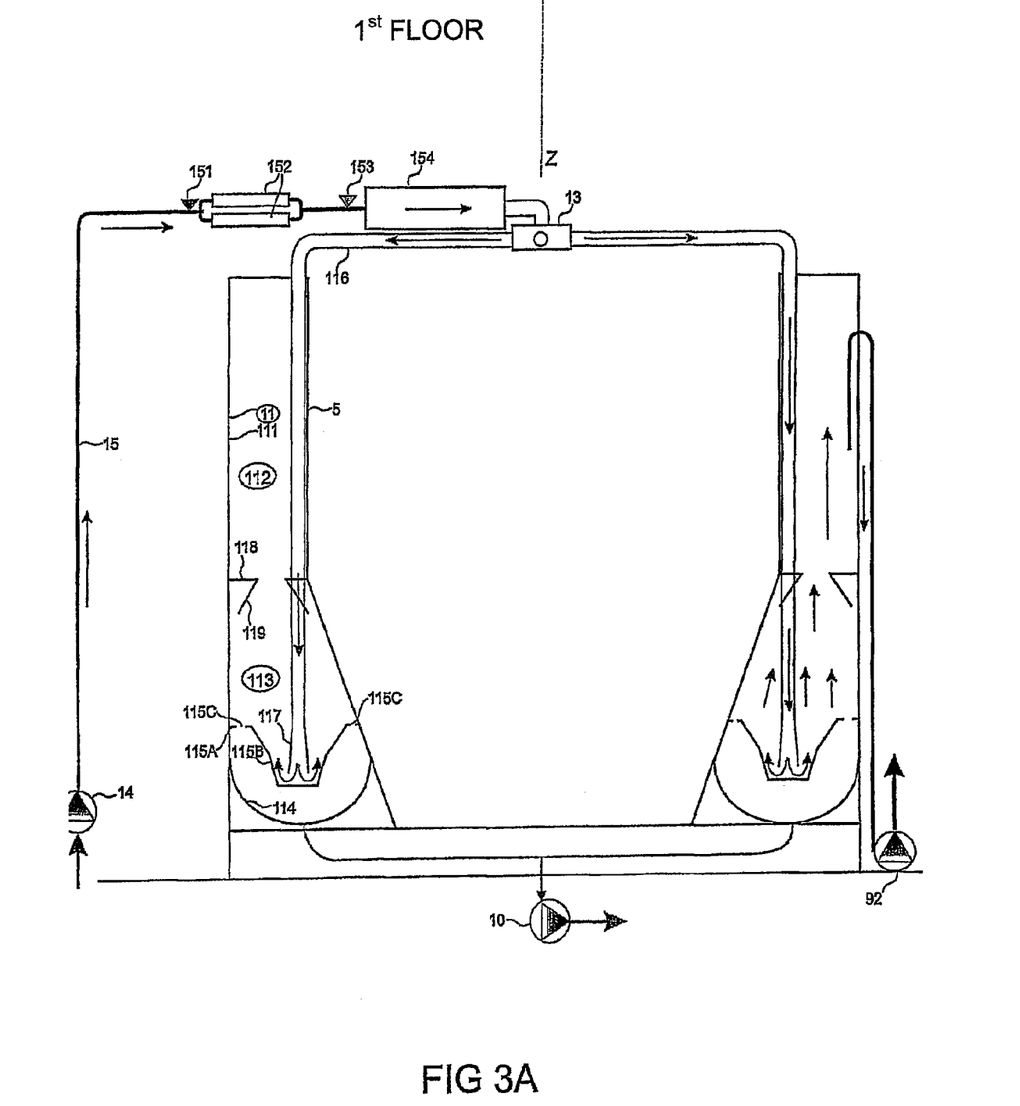
FIG. 3A is a simplified view in axial section showing the pre-treatment section of the variant of FIG. 3.

FIG. 3A shows in isolation the addition to the plant of FIG. 3 in relation to the basic plant shown in FIG. 1.

Figure 3B:
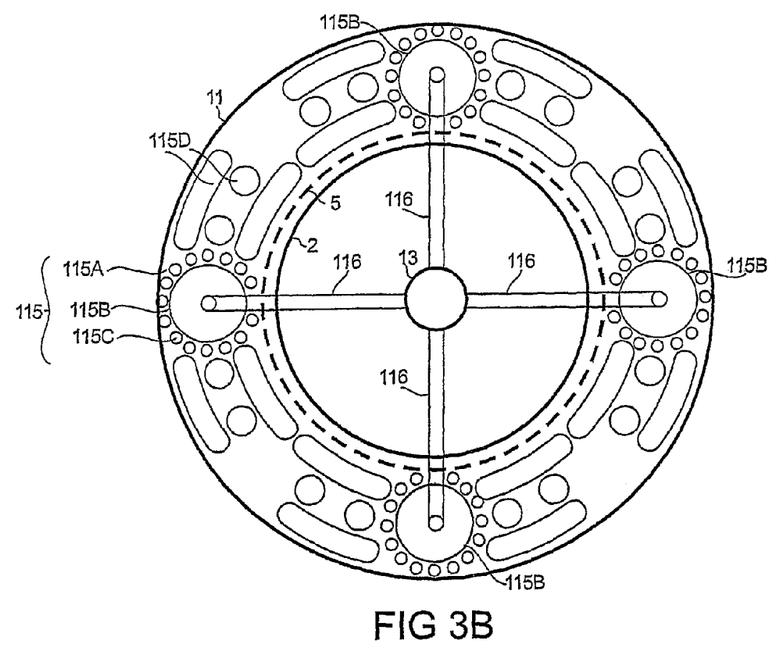
FIG. 3B shows in a top view the annular plate supporting the flocculating vats.

FIG. 3B shows in more detail the shape of the flocculating vat 115 provided in the actual annular plate 115A. The frustoconical cavities are each fed by a pipe 116 departing from the distribution chamber 13. This view shows the distribution of the openings 115C around each cavity 115B for the passage of the sludge flakes emerging from the cavity 115B.

In its portion separating two cavities 115B, the collar 115A is traversed by oblong and/or round passages permitting the calm rise of the liquid of the sludge vat 115.

Figure 3C:
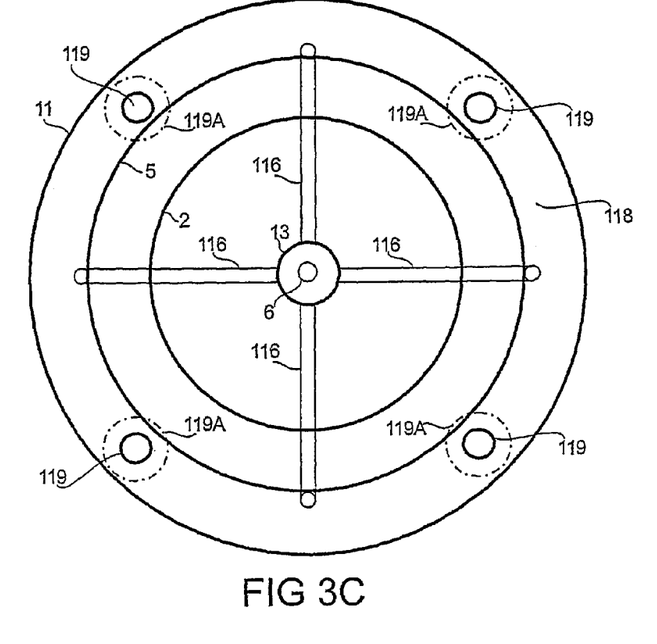
FIG. 3C is a top view of the annular plate separating the lower volume from the upper volume of the outer annular vessel.

FIG. 3C shows the outer vessel 11 sectioned above the partition 118, showing this latter and also the openings 119 bordered by the inlet cones 119A. The figure also shows the pipes 116, emphasising the angular off-set between on the one hand the pipes 116 (the cavities 115B associated but not shown in this figure) and on the other hand the openings 119 occupying intermediate positions.

Figure 4:
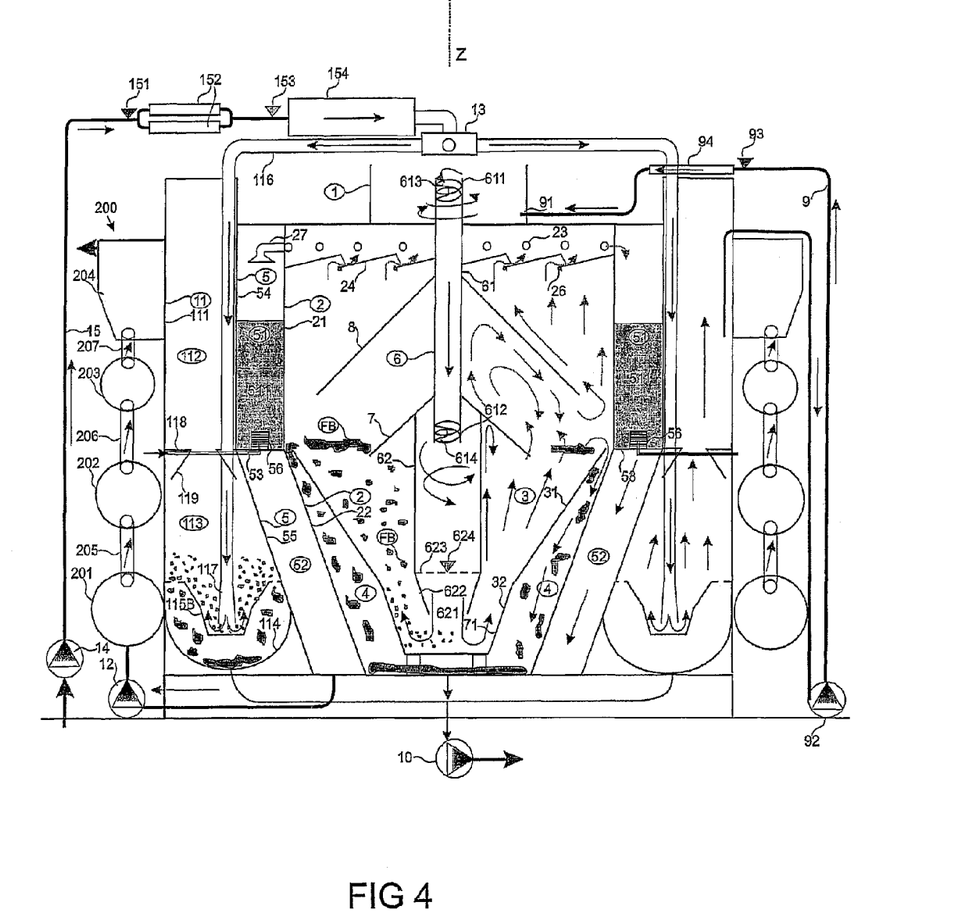
FIG. 4 is a view in axial section of another embodiment of an effluent purifying plant equipped not only with the pre-treatment section but also with a bacteriological treatment means.

FIG. 4 shows another variant of the plant of FIG. 1 or of that with the addition of FIG. 3 with, in addition, means for bacteriological treatment of the filtered effluent, at the outlet of the plant of FIG. 3. As above, the elements identical or analogous to those already described bear the same references and their description will not be repeated.

Figure 4A:
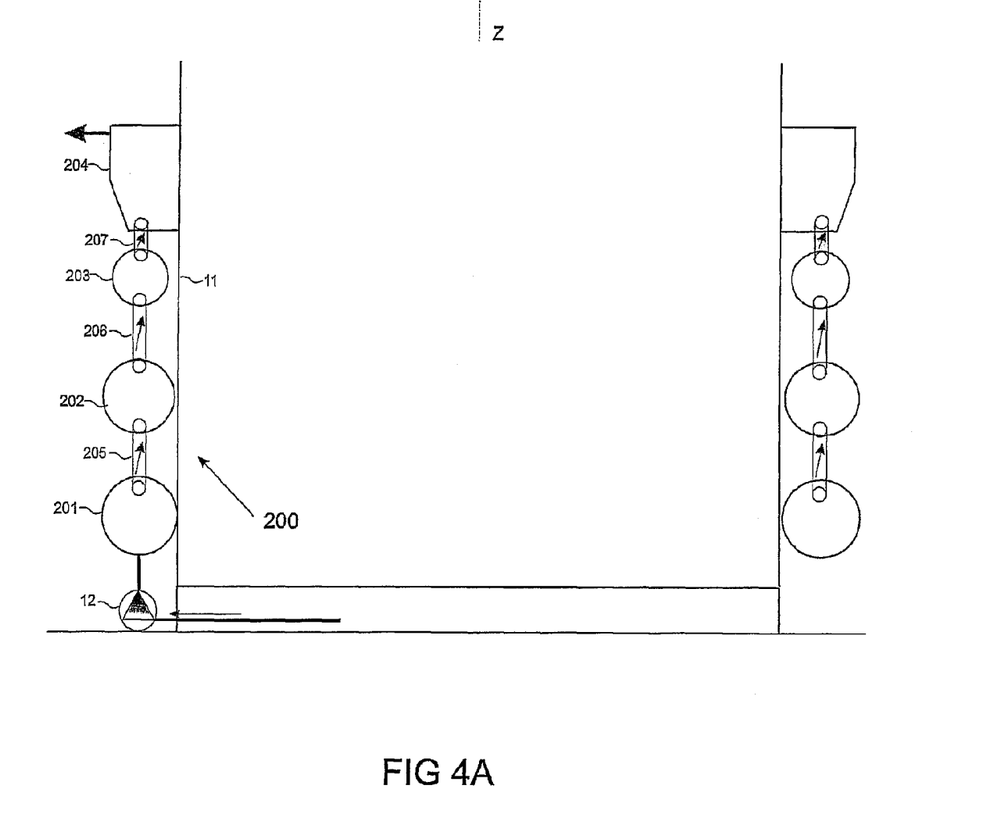
FIG. 4A is an extract from FIG. 4 showing the bacteriological treatment portion of the plant.

Half of the complementary part added to the plant of FIG. 3A is shown in isolation in FIG. 4A.

This complementary part 200 is composed of a series of annular or toroidal chambers 201, 202, 203, surrounding the outer vessel 11 and arranged in a cascade to receive the purified liquid coming from the lower portion 52 of the vessel 5. The liquid (water) is pumped by the pump 12, but instead of being supplied outside, it feeds the cascade of toroidal chambers 201-203 in succession from bottom to top. The toroidal chambers have inner helical guides for imparting to the stream of fluid a rotational movement about its axis of movement. These chambers contain charges which remain in suspension owing to this movement of displacement and rotation of the fluid which passes through them. The chambers communicate with one another through a U-shaped communicating pipe 205, 206, 207, the inlet of which in each case faces downstream according to the circulating movement of the liquid (arrow L) and its charge of particles in the corresponding annular chamber in order to extract liquid therefrom according to the arrival of untreated liquid in the annular chamber without removing from it the charge of particles in suspension and to pass it into the following chamber.

Finally, the last chamber 204 located in the top part serves for drawing off the purified liquid.

Figure 4B:
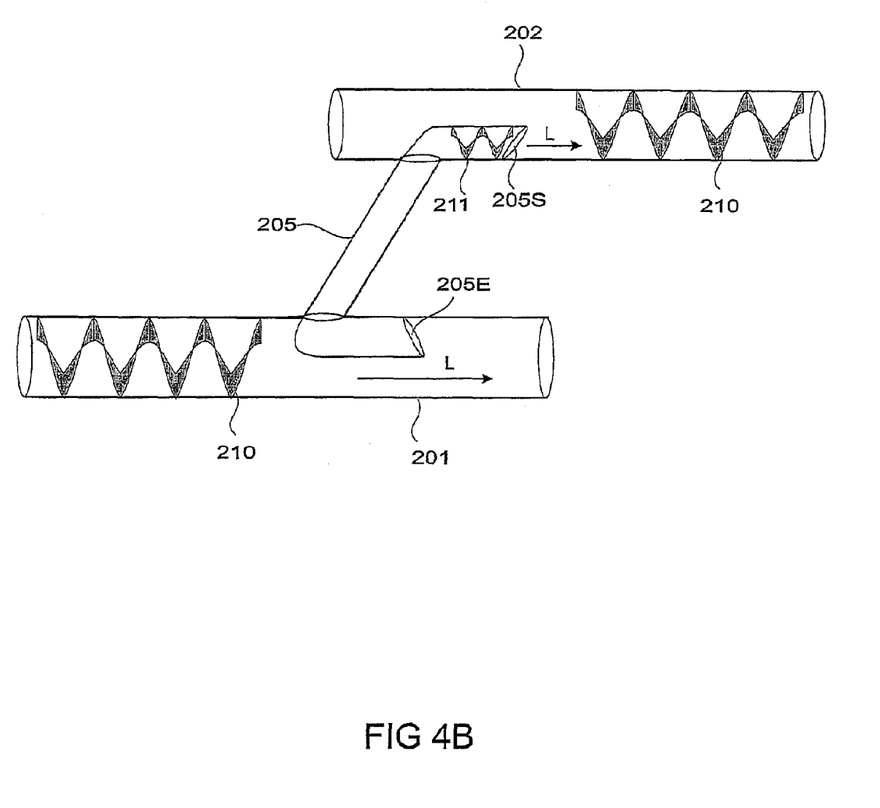
FIG. 4B is a partial view of the connection between two annular chambers of the bacteriological treatment portion of the embodiment of the effluent purifying plant according to FIG. 4.

FIG. 4B shows the detail of the joining of two annular chambers, for example the chambers 201, 202, by a U-shaped pipe 205, the inlet 204E of which opens into the chamber 201 facing downstream in the direction of circulation of the liquid represented by the arrow L inside the chamber 201. Upstream of the inlet 205E, the chamber 201 has a helical guide 210 in the shape of an insert intended to impart to the stream of fluid circulating in the chamber a rotational component about the axis of the chamber. A plurality of such guides may be distributed inside the chamber 201, as also in the other chambers such as the chamber 202.

The connecting pipe 205 opens into the downstream chamber 202 through its outlet 205S, also preferably provided with a helical guide 211, imparting to the liquid opening into the chamber 202 a rotational movement about its axis. The rotational movement is amplified by the helical guide 10 which is located downstream.

The invention claimed is:

1. An effluent purifying plant with centralized structure comprising, on a vertical axis,
    a homogenizing vessel (1) receiving the effluent with the addition of a coagulating or flocculating agent,
    a settling vessel (2) beneath the homogenizing vessel (1),
    a flocculating vat (3) comprising a frustoconical upper portion (31) extended by a lower portion, which vat is placed inside the settling vessel (2) and in which sludge flakes form,
    a pipe (6) arranged in the axis (ZZ), leading downwards, connecting the homogenizing vessel (1) to the lower part of the flocculating vat (3) through which the effluent passes from bottom to top and is clarified in contact with the sludge flakes,
    the pipe (6) comprising an upper tube, one end of which opens into the homogenizing vessel and the other end of which opens into a lower tube of larger diameter than that of the upper tube, the lower end thereof opening into the lower part of the flocculation vat,
    the lower portion of the settling vessel having a frustoconical portion forming the sludge vat (4) which receives the sludge overflowing from the flocculating vat (3),
    an annular vessel surrounding the settling vessel and receiving the filtered water by overflow from the settling vessel (2),
characterized in that
    the homogenizing vessel (1) has a tangential intake (91) for the effluent,
    the inlet (611) and the outlet (612) of the upper tube (61) include a helical guide (613,614) for setting the effluent in rotation,
    the lower tube (62) of larger diameter than that of the upper tube (61) is terminated by an outlet in the form of an upside-down cone (622) with reduced cross-section (621),
    the lower portion (31) of the flocculating vat (3) is frustoconical, with an apex angle smaller than that of its upper portion (32), the lower portion (31) being parallel to the cone of the outlet of the lower tube (62), and
    at least one anti-backflow cone (7,8) surrounds the pipe (6) in the settling vessel (2).

2. A plant according to claim 1, characterized by a second anti-backflow cone (8) arranged above the flocculating vat (3).

3. A plant according to claim 1, characterized in that
    the outlet of the settling vessel (2) has stabilising baffles (24) for the liquid and a peripheral distribution of outlet openings (23),
    the annular vessel (5) surrounding the settling vessel (2) contains a filter-mass (511) in the upper portion (51), its lower portion (52) constituting the storage volume for the filtered water.

4. A plant according to claim 1, characterized in that the taper of the upper portion (31) of the flocculating vat (3) is greater than that of its lower portion (32).

5. A plant according to claim 1, characterized in that the lower tube (62A) is in the shape of two truncated cones (62A, 622) which are assembled by their major base, the inlet cross-section corresponding to that of the upper tube (61) to continue by flaring out, and an injection means (624) injects a flocculating agent in the middle of this volume.

6. A plant according to claim 1, characterized by a metering means (93) for metering the reagent or reagents is provided upstream of the homogenising vessel (1) and this metering means is followed by a static mixer (94).

7. A plant according to claim 1, characterized in that the annular vessel (5) is composed of a lower portion (51A) surrounding the lower portion (22) of the settling vessel (2), and of an upper portion (51A) containing the filter-mass (511A) installed above and in prolongation of the settling vessel (2) and having the same outer wall (54A), these two portions being connected by a pipe, an annular channel (211) surrounding the pipe (6) to connect the upper volume (21) of the settling vessel (2) to irrigation ramps (27A) opening out above the filter-mass (511A).

8. A plant according to claim 1, characterized by a collecting chamber (213) which separates the upper portion (51A) from the upper volume (21) of the settling vessel (2), the collecting chamber (213) being connected to the lower portion (52A) by a pipe equipped with a valve (215).

9. A plant according to claim 1, characterized by an annular pre-treatment vessel (11), surrounding the outer vessel (5), and composed of a lower volume (113) in which the effluent arrives with the addition of a coagulating and/or flocculating agent in order to deposit the sludge flakes there, and of an upper volume (112) in which the partially clarified liquid rises in order to be transferred into the distribution vessel (13).

10. A plant according to claim 9, characterized in that the annular pre-treatment vessel (11) comprises a flocculating vat (115) formed of an annular plate (115A) provided with frustoconical cavities (115B) bordered by passage openings (115C), a pipe (116) coming from an effluent distribution chamber (113) opening into each cavity (115B), and the lower volume is bordered by a bottom (114) in the shape of an annular collar constituting the sludge storage vat (114).

11. A plant according to claim 9, characterized in that the lower volume (113) of the vessel (111) is separated from its upper volume (112) by a partition (118) provided with openings (119), the inlet of which is defined by divergent cones (119A), these openings (119) being offset angularly in relation to the angular position of the flocculation cavities (115B) so as to occupy an intermediate position in each case.

12. A plant according to claim 1, characterized in that it comprises a complementary bacteriological treatment portion (200) composed of a series of annular chambers (201, 202, 203) surrounding the outer vessel (11) and receiving the cleansed liquid, which passes through these chambers (201, 202, 203) connected in a cascade by communication pipes (205, 206, 207), being provided with helical guides (210) for setting in rotation the stream of liquid and suspended particles constituting the charge of each chamber, the communication pipes (205, 206, 207) being U-shaped tubes, the inlet arm (205E) of which faces downstream in the upstream chamber in order to open out through an outlet (205S) facing downstream in the following annular chamber, in the direction of flow of the liquid in these chambers.

13. A plant according to claim 12, characterized in that the outlet arm (205S) of the communication pipe (205, 206, 207) includes a helical guide (211).

* * * * *